July 17, 1956 V. P. FALCONE 2,754,530
WAX TABLE STRIPPING MACHINES
Filed Sept. 14, 1951 2 Sheets-Sheet 1
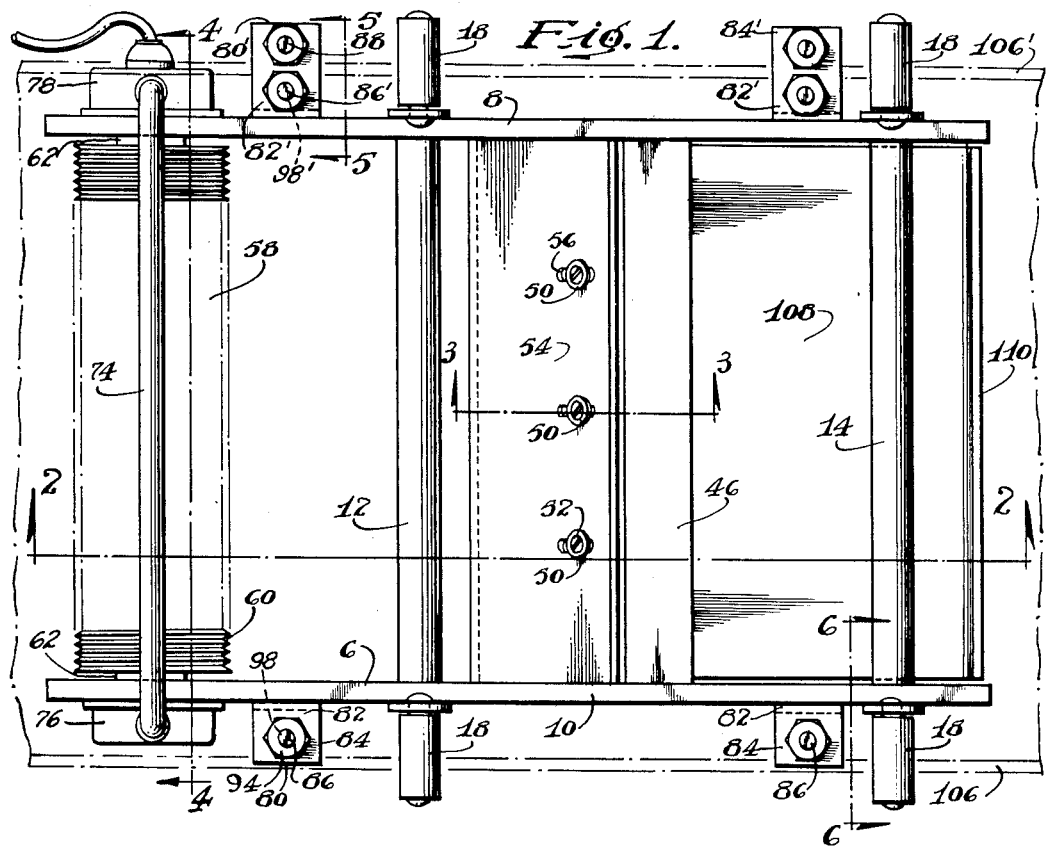
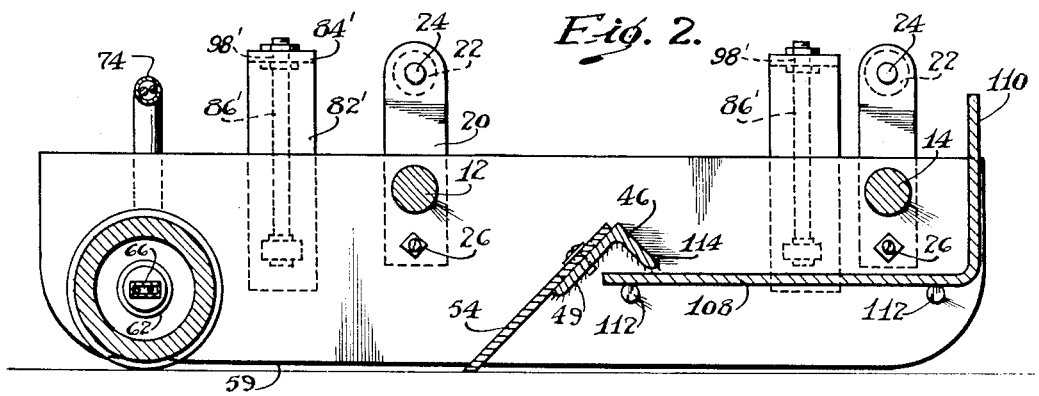
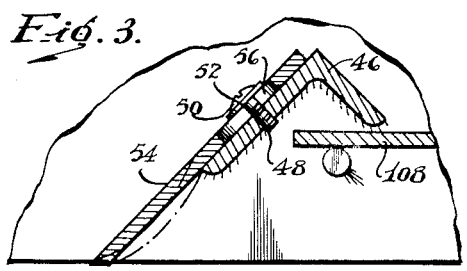
INVENTOR
*Vincent Patsy Falcone*
BY *John B. Brady*
ATTORNEY

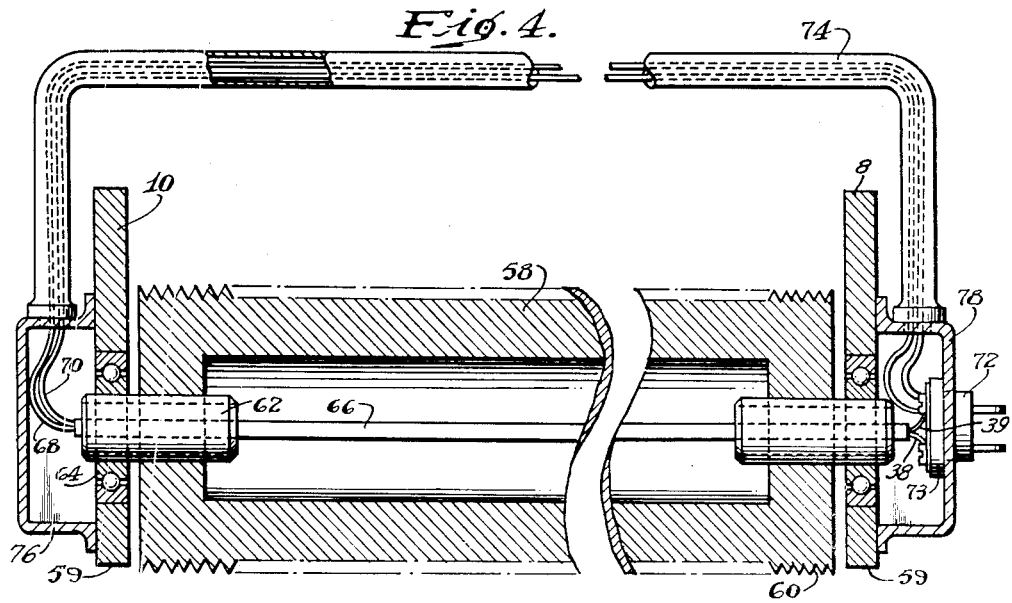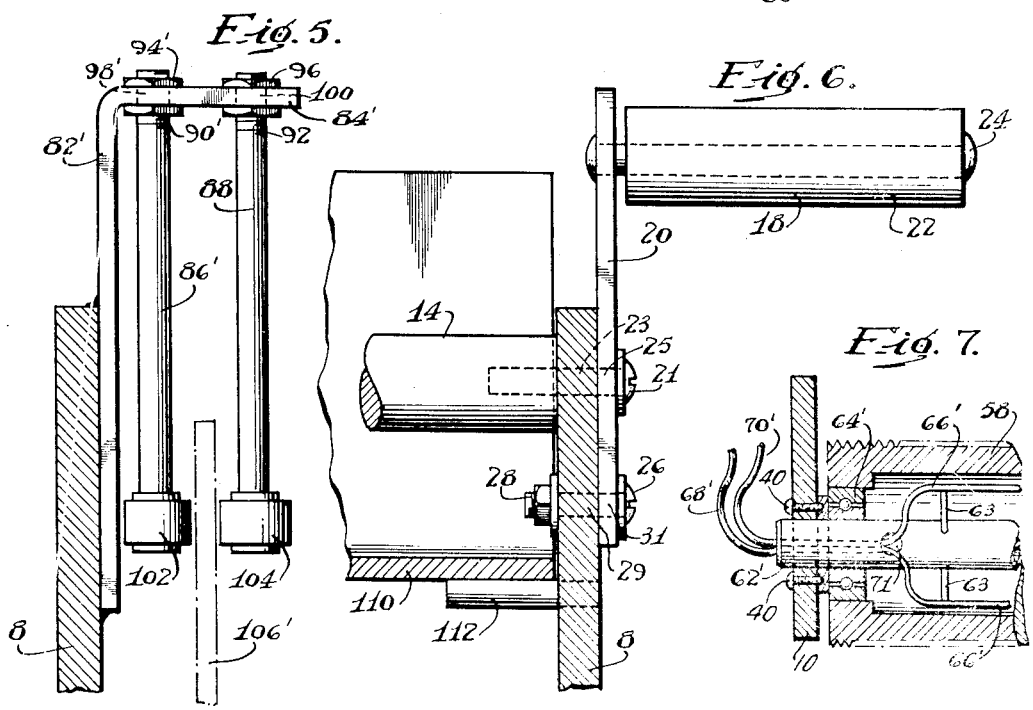

United States Patent Office 2,754,530
Patented July 17, 1956

2,754,530

WAX TABLE STRIPPING MACHINES

Vincent Patsy Falcone, Flushing, N. Y.

Application September 14, 1951, Serial No. 246,611

7 Claims. (Cl. 15—93)

My invention relates to that class of devices known as stripping machines and more particularly to that class known as wax table stripping machines.

In the industry of printing designs on cloth or the like, the present practice is to cover a table approximately fifty-two inches wide and fifty yards long with a very heavy twill, canvas or the like. Sometimes a type of oil cloth is employed. An adhesive such as wax is then put over the covering, thereby forming a surface which will hold the cloth to be imprinted with suitable tautness. After use, the wax must be removed from the canvas and it is to this removal that the present invention is directed.

When the wax has been run onto the canvas, the device becomes what is known in the industry as a wax-table and removing the wax after use is called stripping. Thus, my present invention is of a class known as wax table stripping and is a machine for accomplishing this object. I have found in practice that the wax is usually placed so that a border of about three inches of uncovered canvas remains along each linear side. The table may have rails along its outer edges.

At present it is necessary to employ many men with dull knives, spatulas or blades to manually scrape the wax from the table. The number of men employed depends, of course, upon the time allowed for the removal. Due to the carelessness or lack of skill of the operators, sometimes the canvas is ripped and torn, necessitating removal and replacement, creating an extra delay and expense. I have found that by the use of my invention two men can satisfactorily strip the usual wax table in a fraction of the time heretofore required.

The principal object of my invention is to provide a device for quickly and evenly removing wax or the like from a working surface.

The problem that is presented to the industry and one of the reasons for my invention is that all prior devices for the purpose of wax table stripping known to me involve heating blades or the like which are stiff and actually function as chisels in removing the layer of wax. I am aware of the paint scrapers which employ a thin flexible heated blade to remove paint and varnish, but this device is entirely unsuited to removing wax such as wax table stripping, because the heated edge of the thin blade would operate to begin to melt the small amount of wax immediately in front of the blade which would cool at once upon removal to a degree to become sticky and would cling to the upper side of the blade and hinder further wax removal or would melt further and run down the blade and cool on the other wax not yet removed to form a hinderance rather than an aid. I have tried employing two heated blades, one in front of the other, and have found in practice this combination failed to operate satisfactorily.

My present invention employs a novel roller in combination with a spatula blade. The roller is heated and is provided with cutting edges to soften and cut into the wax. I provide also a thin flexible unheated blade which removes the softened wax quickly and thoroughly. By the use of the thin flexible blade I am able to remove wax from the low spots formed in the surface to be cleaned because the pressure I am able to exert on the blade is such that the edge in contact with the table follows the irregular contours and scoops out the wax as the blade progresses forwardly.

Another object of my invention is to provide a novel means for softening and melting the wax to facilitate the removal process.

Another object of my invention is to provide a device for the purposes described that requires a minimum number of operators.

Another object of my invention is to provide a device that may be employed to remove non-water soluble substances such as wax which will collect and retain the wax as it is removed.

Another object of my invention is to provide novel means to insure the removal of wax from low spots.

A still further object of my invention is to provide a device for removing wax or the like from a working surface that may be operated by unskilled operators.

While I have described the main objects of my invention it will be readily apparent that my invention has manifold other uses in removing surface coverings.

My means of accomplishing the foregoing objects may be more readily apprehended by having reference to the appended drawings in which, Figure 1 is a top plan view of my device;

Figure 2 is a vertical sectional view, taken on lines 2—2 of Figure 1;

Figure 3 is a vertical view, partly in section, taken on lines 3—3 of Figure 1.

Figure 4 is a vertical sectional view taken on lines 4—4 of Figure 1;

Figure 5 is a vertical sectional view taken on lines 5—5 of Figure 1;

Figure 6 is a vertical sectional view taken on lines 6—6 of Figure 1; and

Figure 7 is a vertical sectional view of a modified form of mounting.

Similar reference numerals refer to similar parts throughout the specification.

As shown in the drawings, I provide a frame or carriage 6, indicated generally as having sides 8 and 10 which are fixed in position by a number of braces 12, 14, and form runners. These braces may be made of heavy material to add weight and may be attached to the sides 8 and 10 by any suitable means. In practice, I have found that spot welding forms a satisfactory means since I prefer to employ weldable metal throughout the frame construction. It is clear that, should it be desirable to do so, the frame 6 may be made of any suitable material or combinations thereof. For instance, the sides 8 and 10 may be of wood and the braces 12, 14 of metal or wood, fiber or the like. Of course, the entire frame 6 could be molded if desired. However, at present I prefer to employ a metal which is a good heat conductor. I provide suitable handles designated generally as 18. These handles 18 may be of any desired construction or configuration. I shall described only one handle since they are of like construction. I prefer to employ a simple arrangement comprising an upright strap 20 to which a handle 22 is attached by means of an axle 24. The strap 20 may be attached to the side 8 of the frame 6 by any conventional means. I prefer to employ bolt 26 and nut 28 through coaxial holes 29 and 31 in the side 8 and the strap 20. I provide a screw 21 threaded into a brace 14 through coaxial holes 23 and 25 as shown. In Figure 6 I have shown a detail of one of my handles attached to brace 14.

As clearly shown in Figure 2, I provide a scraper blade 54 suitably mounted on an angle brace 46 which is positioned as shown between the sides 8 and 10 of the frame 6. This brace 46 may be welded or otherwise solidly attached to the frame 6 as described. At present I prefer to employ a 90° angle of metal welded to the frame so that its surfaces 49 and 114 are at 45° with the plane of the working surface. However, any desired angle can be achieved by means of the brace 46. I provide threaded holes 48 in the front face 49 of this brace 46 into which screws 50 may be inserted. I provide lock washers 52 on the screws 50 for purposes which are readily apparent. On brace 46 I mount my scraper blade 54 which I prefer to make of thin flexible steel. Of course, any other suitable material will operate properly but at present I have great success with a thin flexible steel blade which extends beyond the bottom of frame 6 to a slight degree as shown in Figure 2. When I thus employ a flexible blade, I am able to bend the blade as shown in Figure 3 so that a great deal of pressure may be applied to the surface to be cleaned. Thus, the manner of performance of my blades is that of a spatula and, as the blade is bent in a convex position, the bottom of the frame 6 comes into contact with the surface to be cleaned, allowing smoothness of operation. With this type of scraping blade I have found in practice that all of the wax is removed and I have eliminated leaving any wax in the so-called low-spots not heretofore removable by the rigid scraper blades presently in use. In Figure 2 I have shown the scraper blade 54 as extending below the bottom of the frame 6 because the figure does not show the machine in use. I provide slots 56 in the scraper blade 54 to allow the blade to be positioned as desired. It is obvious that this arrangement is desirable in that it permits the scraper blade 54 to be applied to the surface with varying degrees of pressure. In this manner the flexible edge will dig into the low spots. It is to provide a maximum uniform pressure that I prefer that the braces 12 and 14 be constructed of heavy material as explained above.

To those skilled in this art, it is obvious the wax must be softened before it can be removed. In order to accomplish this, I provide a novel softener employing a device which is essentially a heated roller 58. As shown in Figure 4, I provide a roller 58, having grooves 60. This roller extends below the lower forward edge 59 of the frame 6. These grooves 60 may be in the form of threads or may be cut into the roller to provide lands, or the like. If spiral grooves such as pipe threads are employed a desirable scarification results. My object is to provide heated edges on the roller as well as a heated roller to cut into the wax and in practice I have found pipe threads are satisfactory and easily cut. The roller 58 is preferably made of brass but any good heat conductor may be employed. I cut a thread sufficiently deep to penetrate the wax to, or almost to, the depth of the covering, but not so deep as to cut into the surface.

Since the heated roller 58 must be free to revolve as the machine is advanced any suitable means to accomplish this may be employed. I have shown two mechanical arrangements, but no particular means is claimed and any of the well known arrangements may be employed.

Because the roller is heated internally by electrical means the wires leading to the elements must enter the roller from opposite sides. I shall describe only one side since both are identical. Thus, as shown in Figure 4, I provide a bushing 62 which is sweated or otherwise fixedly attached to the roller 58. This bushing 62 extends beyond my roller 58 to a sufficient length for a bearing race 64 to be mounted thereon. It may be press-fitted. In practice, the bearing race 64 exactly fits into side 10 of the frame 6. Spaced from the inside of the bushing 62 I provide a heating element 66. This heating element is so well known that no one particular means is preferred. However, in Figure 4 I show the use of a heating tube 66 such as a Calrod unit, with the usual wires 68 and 70 at one side and wires 38 and 39 at the other side and the usual plug connection indicated generally as 72. Wires 68 and 70 and 38 and 39 are of such tensile strength and rigidity that they support the heating tube 66 at each end in a stationary position free and clear of the bushings 62 which revolve around the heating tube 66. Any suitable means may be provided to positively support the ends of heating tube 66 from the opposite ends on the exterior faces of the sides 8 and 10 in instances where the suspension through the wires 68—70—38—39 is not sufficient. A wire conduit 74 joins two housings 76 and 78 for protection of the wiring. I provide a thermostat to control the heat in the roller 58, but the construction is so well known I have not indicated any particular means, other than showing the thermostat generally at 73.

Referring to Figure 7, I show a slightly different form of mounting my roller. A hollow shaft 62' is mounted inside a bearing race 64' and the roller 58 is press-fitted on the outside of the bearing race 64'. The hollow shaft 62' conducts the wires 68' and 70' through a hole 71 to connect with a heating element 66' fixedly attached to the shaft 62' by clamps 63 or any other suitable means. The internal bearing surface of the bearing race 64' is secured to the side 10 by suitable means such as screws 40. In each form of my invention the roller 58 revolves around the heating element 66 which is stationary with respect to the roller.

In order to hold my machine in place on the table I provide guides 80 on the sides of the machines. These guides 80 may be single or double, as shown in Figure 1. The single guides comprise a plate 82 with a top flange 84. Although they may be of any suitable material, in practice I prefer to have this plate 82 and the flange 84 of heavy material so as to add weight to the machine. The guide bar 86 is attached through hole 98 by double nut 94, on threads not shown. The plates 82 may be welded or otherwise fixedly attached to the side of the frame 6. Referring to Figure 5, I have shown a double guide arrangement. The plate 82' has a flange 84' which is adapted to accommodate two spaced guide bars 86' and 88. These bars 86' and 88 have threads 90' and 92 on one end upon which double nuts 94' and 96 are positioned to hold the guides 86' and 88 in position through flange 84' by means of holes 98' and 100. Padded rollers 102 and 104 are positioned at the opposite ends of the guide bars 86' and 88. These rollers 102 and 104 are spaced so that a rail 106' on the edge of the table to be cleaned will be accommodated between. In this manner, the frame 6 will always travel with the minimum of side motion. It is clear to those skilled in the art that either the double or the single roller guides may be employed. If the table to be cleaned has two side rails the single guides may be used, together with the double guide which embraces one side rail with the single guides pressing against the other side rail.

To collect wax as it is scraped off the table, I provide a tray 108 which I prefer to make of heavy material in order to add weight to the machine. However, it is obvious that any suitable material may be employed. This tray 108 is fashioned with a lip 110 and, for convenience, I provide pins 112 which are attached to the side of the frame 6 by any of the well known means to hold the tray 108. The forward edge of the tray 108 slides under the rear face 114 of the brace 46 so that the wax will not spill out on the cleaned surface. The rear edge 110 is turned up as shown.

*Operation*

The operation of my device is extremely simple. The scraper blade is lowered to the desired depth, and the heat is turned on in the roller 58. As soon as the temperature of the roller rises to the desired heat, the machine is ready to operate. The roller guide 88 is placed outside of the rail 106' and the roller is passed over the wax at the end of the table until it is melted and cut sufficiently to begin the scraping operation. The frame is then lowered and pushed forward with the scraper blade 54 scraping the softened wax. I have found that with very little practice, unskilled workers very quickly learn to operate the machine satisfactorily. Once the wax is cut by the hot grooves and thus softened, the scraper blade readily scrapes up the soft wax which falls over into the tray for collection. The roller, which extends below the frame, is always in contact with the wax and softens it preparatory to the scraper separating it from the table.

Having described my invention, what I regard as new and desire to protect by Letters Patent is:

1. A wax removing device comprising a frame including a pair of side runners, a plurality of braces extending between said runners, a forward hollow roller mounted between said side runners, a grooved surface formed on said roller, means within said roller for heating the grooved surface of said roller, a flexible scraper blade, said scraper blade being mounted between said side runners to the rear of said roller, a plurality of handle means secured to said frame for moving the device relative to a surface of wax to be removed, collecting means for holding the wax removed, guide means mounted on the exterior of said frame for preventing lateral movement of said frame and means for journaling said roller while excluding entry of foreign matter into the ends of said hollow roller.

2. A wax removing device comprising a frame including a pair of side runners, a plurality of braces extending between said runners, a forward hollow roller mounted between said side runners, raised cutting edges extending circumferentially from said roller, means within said hollow roller for heating the raised cutting edges of said roller, a flexible scraper blade, said scraper blade being mounted between said side runners to the rear of said roller, a plurality of handle means secured to said frame for moving the device relative to a surface of wax to be removed, collecting means for holding the wax removed, guide means mounted on the exterior of said frame for preventing lateral movement of said frame and means for journaling said roller while excluding entry of foreign matter into the ends of said hollow roller.

3. A wax removing device comprising a frame including a pair of side runners, a plurality of braces extending between said runners, a forward hollow roller mounted between said side runners, spiral grooves in the outside of said hollow roller, means within said hollow roller for heating the spiral grooves of said roller, a flexible scraper blade, said scraper blade being mounted between said side runners to the rear of said roller, a plurality of handle means secured to said frame for moving the device relative to a surface of wax to be removed, collecting means for holding the wax removed, guide means mounted on the exterior of said frame for preventing lateral movement of said frame and means for journaling said roller while excluding entry of foreign matter into the ends of said hollow roller.

4. A wax removing device comprising a frame including a pair of side runners, a plurality of braces extending between said runners, a forward hollow roller mounted between said side runners, an undulated surface on said roller with the undulations extending transversely to the direction of movement of the rollers, means within said hollow roller for heating said roller, a flexible scraper blade, said scraper blade being mounted between said side runners to the rear of said roller, a plurality of handle means secured to said frame for moving the device relative to a surface of wax to be removed, collecting means for holding wax removed, longitudinal roller guides mounted on the exterior of said frame for preventing lateral movement of said frame and means for journaling said roller while excluding entry of foreign matter into the ends of said hollow roller.

5. A wax removing device comprising a frame including a pair of side runners, a plurality of braces extending between said runners, a forward hollow roller mounted between said side runners, V-shaped grooves formed on the surface of said roller and extending in the direction of movement of the roller, means within said hollow roller for heating said roller, a flexible scraper blade, said scraper blade being mounted between said side runners to the rear of said hollow roller so that its scraping edge meets the surface to be scraped at an acute angle, a plurality of handle means secured to said frame for moving the device relative to a surface of wax to be removed, collecting means for holding the wax removed, guide means mounted on the exterior of said frame for preventing lateral movement of said frame and means for journaling said roller while excluding entry of foreign matter into the ends of said hollow roller.

6. A wax removing device comprising a frame including a pair of side runners, a plurality of braces extending between said runners, a forward hollow roller mounted between said side runners, a multiplicity of spaced cutting edges formed on the surface of said roller, means within said hollow roller for heating the cutting edges on the surface of said roller, a flexible scraper blade, said scraper blade benig mounted between said side runners to the rear of said roller, said scraper blade being adapted to scrape wax from a wax surface softened by said roller, a plurality of handle means secured to said frame for moving the device relative to the wax surface, collecting means for holding the wax removed, guide means mounted on the exterior of said frame for preventing lateral movement of said frame and means for journaling said roller while excluding entry of foreign matter into the ends of said hollow roller.

7. A wax removing device comprising a frame including a pair of side runners, a hollow roller journaled in the front part of said frame between said side runners, annular cutting edges disposed in spaced parallel positions on the surface of said hollow roller, heating means within said hollow roller for heating the cutting edges on the surface of said roller, a flexible scraper blade mounted on said frame in rear of said roller, collecting means for said wax, closed housings supported on the exterior of said side runners and means extending from the interior of said closed housings through said side runners into the ends of said hollow roller for journaling said roller and housing electrical connections for said heating means while excluding the entry of wax scrapings into the ends of said hollow roller.

References Cited in the file of this patent

UNITED STATES PATENTS

| | | |
|---|---|---|
| 751,527 | Marr | Feb. 9, 1904 |
| 894,790 | Ackerman | July 28, 1908 |
| 963,942 | Richardson | July 12, 1910 |
| 1,215,822 | Leu | Feb. 13, 1917 |
| 1,534,953 | Hohman | Apr. 21, 1925 |
| 1,599,713 | Perlman | Sept. 14, 1926 |
| 1,668,142 | Conger | May 1, 1928 |
| 2,047,372 | Jalens | July 14, 1936 |
| 2,221,318 | Worthing et al. | Nov. 12, 1940 |
| 2,211,716 | Fallon | Aug. 13, 1940 |
| 2,258,313 | Bing | Oct. 7, 1941 |
| 2,261,893 | Wolfard | Nov. 4, 1941 |
| 2,264,278 | Danforth | Dec. 2, 1941 |
| 2,273,423 | Somes | Feb. 17, 1942 |
| 2,308,047 | Blakeslee | June 12, 1943 |
| 2,421,319 | Ehret | May 27, 1947 |
| 2,526,906 | Schaab | Oct. 24, 1950 |
| 2,551,811 | Mueller | May 8, 1951 |